United States Patent Office 3,692,545
Patented Sept. 19, 1972

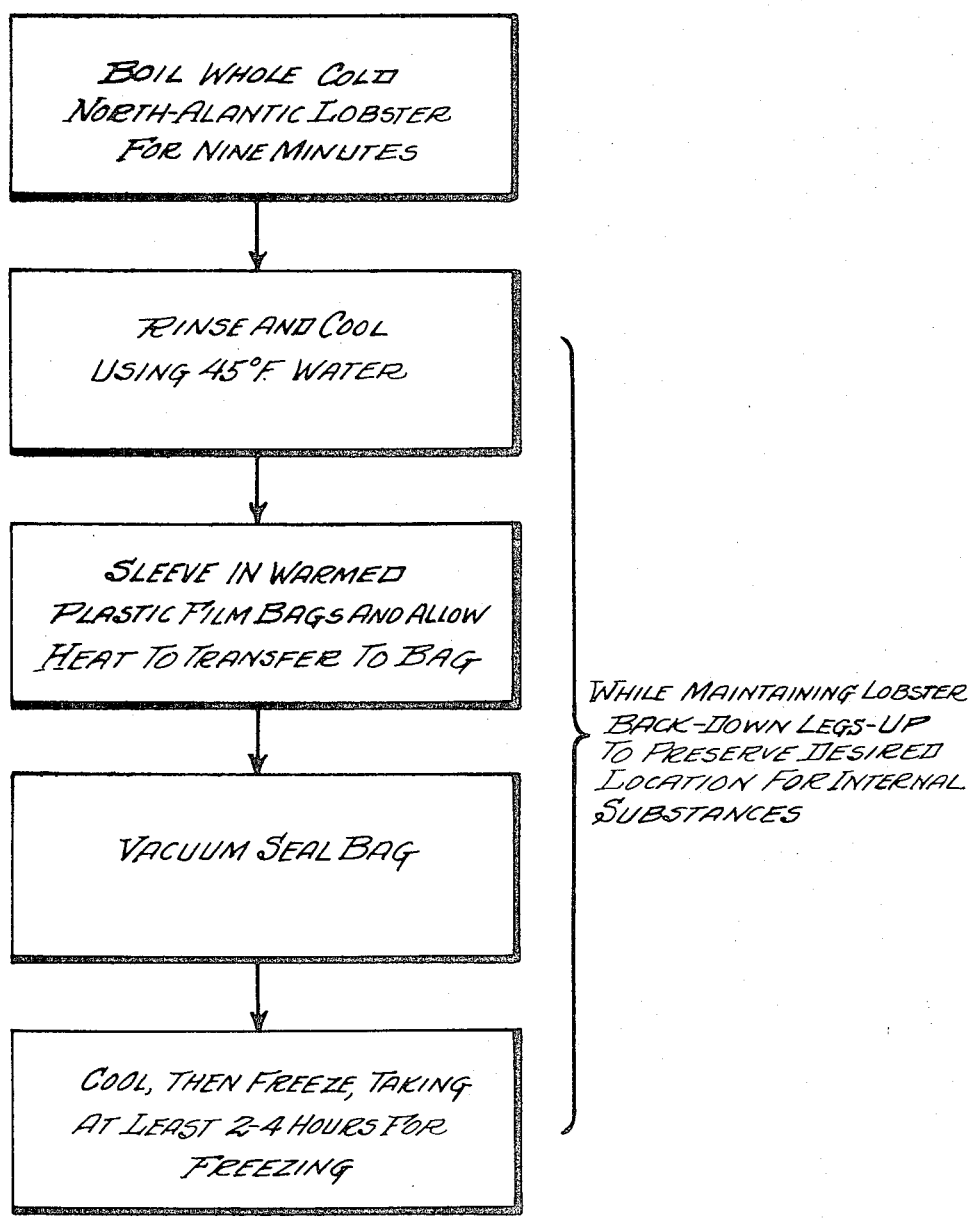

3,692,545
FROZEN COOKED WHOLE COLD NORTH
ATLANTIC LOBSTER
Robert Moore, 240 Forest Ave., Salem, Mass. 02025
Filed Oct. 14, 1970, Ser. No. 80,734
Int. Cl. A23b 3/06
U.S. Cl. 99—195          7 Claims

ABSTRACT OF THE DISCLOSURE

Cold North Atlantic lobsters are boiled for about 9 minutes in salted fresh water, removed, rinsed and cooled with about 45° F. fresh water, sleeved in warmed, flexible plastic film bags which are then vacuum sealed after a resting period during which heat from the lobster transfers to the bag. The vacuum packed lobsters are then cooled and frozen over a period of 2–12 hours to permit moderate sized ice crystals to form in the meat. During the process, the lobsters are kept upside-down, i.e. feet-up to preserve a desirable position for the lobster's blood and internal substances.

BACKGROUND OF THE INVENTION

Although lobsters are caught in the coastal waters in many regions, "Maine" lobsters have a reputation for succulentness that has resulted in increasingly widespread consumption of this crustacean. Traditionally, consumption was limited to the northern New England coast summer resort areas and surrounding areas which could be served by trucks having brine tranks, ice or artificial refrigeration facilities. With the growth of the air freight business the market for live Maine lobsters increased. However, the market remains risky and has troublesome aspects, becaus some lobsters shipped live arrive dead and are unsaleable, because the immediate attention which must be given lobster shipments often routs consignees from bed at odd hours to meet planes bearing their shipments, etc.

The lobsters which may be used in the process according to the present invention are believed by the inventor to be the most succulent. They are properly designed "cold North Atlantic lobster" and are taken from the North Atlantic ocean in the waters off Cape Elizabeth, Maine running in an easterly direction along the entire coast of Maine to New Brunswick, Canada, including the entire Bay of Fundy, continuing in an easterly direction along the entire coast of Nova Scotia ending at Sydney, Cape Breton Island, Nova Scotia, up to more than twenty miles out into the ocean. The family is Homaridae.

The prior art known to the inventor includes Canadian patent 770,462.

On page 2 of that patent, there is a discussion of packing frozen, precooked lobsters in clear, heat-shrinkable plastic material. In this instance, reference is made to the fact that in the prior art lobsters have been placed in heat-shrinkable plastic bags and the air then evaculated from the latter. After the filled bag has been sealed, it is dropped into hot water for a few minutes to effect shrinkage of the plastic material so as to form a tight skin about the lobster. On page 4 of this patent, reference is made to boiling lobster 4–5 minutes.

The U.S. patent of Altenburg, No. 2,501,655, of Mar. 28, 1950, discloses boiling lobsters for an interval of not less than 15 seconds nor more than 5 minutes. Thereafter, the lobster is cooled and subjected to quick freezing.

The following U.S. patents disclose various methods for precooking lobsters: 3,346,395, D'Aquin, Oct. 10, 1967; 3,222,186, D'Aquin, Dec. 7, 1965; 2,540,036, Spencer, Jan. 30, 1951; and 2,297,411, Henning, Sept. 29, 1942.

The following U.S. patents disclose methods used for freezing precooked lobster and foods in general: 1,608,832, Birdseye, Nov. 30, 1926; 2,151,967, Hedreen, Mar. 28, 1939; 2,546,428, Byrd, Mar. 27, 1951; 2,978,334, Lapeyre, Apr. 4, 1961; and 3,261,693, Jung, July 19, 1966.

The following U.S. patents disclose methods and apparatus for shipping, fragmenting and treating lobsters: 651,011, Griffin, June 5, 1900; 965,706, Greiner, July 26, 1910; 1,016,627, Higgins, Feb. 6, 1912; 1,252,865, Thompson, Jan. 8, 1918; 2,080,263, Gibson, May 11, 1937; 2,335,806, Sjostrom, Nov. 30, 1943; 3,022,175, Wakefield, Feb. 20, 1962; 3,264,116, Gray, Aug. 2, 1966; and 3,276,-070, Kaspar et al., Oct. 4, 1966.

SUMMARY OF THE INVENTION

The following is a brief discussion of the process of the invention as it is conducted in its most preferred form:

When the process begins, fifty pounds of live cold North Atlantic lobsters are put into two fifty pound open-wire, non-corrosive baskets so that one hundred pounds are processed at a time. The two baskets are then lowered into two stainless steel cookers which each contain forty gallons of fresh boiling water and fifteen pounds of granulated salt. When the water returns to a boil the cooking time begins for a period of nine minutes. Then the baskets are removed and immediately rinsed and cooled to about 150 degrees F. with 45° F. fresh water. The precooking and rinsing procedure accomplishes the following: elimination of bacteria, solidification of the internal substances of the lobster which is of particular importance when lobsters are shedding their shells and the roe is more liquid in the late spring and summer months and this procedure releases the meat from adhering to the inside of the lobster shell. After each one thousand pounds is processed the cookers are emptied, cleaned and refilled with new water and salt.

The precooked rinsed lobsters are immediately removed from the baskets and placed on a stainless steel table upside down on their backs. Then the lobsters are sleeved into flexible plastic film bags of low vapor permeability. The dimensions inside the bags are fifteen inches long by six inches wide. Before use the bags are heated to a temperature of about 90° F. to make them more flexible and less subject to puncture by sharp parts of the lobster. The lobster is sleeved into the bag by the use of a light gauge steel sleever which is curved and sixteen inches long with a four inch extension at the end for protrusion into the end of the bag. The lobster slides into the bag tail first. Each bag containing a lobster is then placed with the lobster upside down on its back for fifteen minutes before the next step. This allowance of time is for the remaining heat from the lobster itself to transfer to the warm bag. This results in the bag becoming more pliable for the next step.

Throughout the entire process, the lobsters are placed on their backs so that the lobster blood will remain in and around the center of the lobster body and the internal substances will have less tendency to run into the tail.

In the next step the air is drawn out of each bag through the use of a vacuum sealing machine so effectively that the bag collapses around the lobster so that it is form fitting with very little air content. Also, this is where the pliability of the bag is important, because the sharp points located over the lobster would puncture the bag if the bag were brittle allowing air to reenter the bag. As soon as the vacuum is drawn on the bag, the bag is heat sealed across the width at the end. Then, as each bag is sealed, it is laid upside down on an open mesh wire tray until each tray contains twenty-four lobsters.

The trays allow maximum circulation of air for the freezing purposes. When each tray is filled it goes into a cooling room for four hours where the temperature is maintained at 35° F. Then at the end of four hours, the tray is transferred to a freezer for twelve hours where the temperature is maintained at −20° F. Upon completion of the freezing process, the lobsters are ready for packing which merely consists of weighing the film-packaged frozen cooked lobsters, putting them into retail boxes, marking the net weight on each retail box and then packing twelve retail boxes into a shipping case. The shipping case is sealed and put into a freezer until shipment by refrigerated trucks.

BRIEF DESCRIPTION OF THE DRAWING

In the drawing, the figure is a schematic summarization of the steps involved in a practice of the presently preferred embodiment of the invention.

DISCUSSION OF THE PRESENTLY PREFERRED EMBODIMENT OF THE INVENTION

The following is a discussion of the process of the invention as it is conducted in its most preferred form:

When the process begins, fifty pounds of live cold North Atlantic lobsters are put into two fifty pound open-wire, non-corrosive baskets so that one hundred pounds are processed at a time. The two baskets are then lowered into two stainless steel cookers which each contain forty gallons of fresh boiling water and fifteen pounds of granulated salt. When the water returns to a boil the cooking time begins for a period of 9 minutes. Then the baskets are removed and immediately rinsed and cooled with 45° F. fresh water. The precooking and rinsing procedure accomplishes the following: elimination of bacteria, solidification of the internal substances of the lobster which is of particular importance when lobsters are shedding their shells and the roe is more liquid in the late spring and summer months and this procedure releases the meat from adhering to the inside of the lobster shell. After each one thousand pounds is processed the cookers are emptied, cleaned and refilled with new water and salt.

I have found through experimentation that boiling for a shorter period of time than about 8 minutes, for instance blanching the lobster for 30 seconds to 5 minutes is definitely insufficient to prevent lobster blood, roe (before spawning) and other internal non-meaty substances of the lobsters from flowing into the tail and contaminating the tail meat so it is unsightly and repulsive to some consumers.

If the lobster is cooked much longer than 9 minutes, for instance for 10 minutes or more, its meat suddenly toughens irreversibly. In order to be legally kept, a caught cold North Atlantic lobster must measure at least 3¾₁₆ inches long along the back from the eyes to the beginning of the tail. The present process is applicable to such lobsters, weighing at least 12 ounces up to not more than about 22 ounces. Preferably, processing is begun as soon as possible after the lobsters are caught, most advantageously within 24 hours of being caught.

Throughout the entire process until fully frozen, the lobsters are placed on their backs so that the lobster blood will remain in and around the center of the lobster body and the internal substances will have less tendency to run into the tail.

The precooked and rinsed lobsters are immediately removed from the baskets and placed on a stainless steel table upside down on their backs. Then the lobsters are sleeved into flexible plastic film bags of low vapor permeability. The dimensions inside the bags are fifteen inches long by six inches wide. Before use the bags are heated to a temperature of about 90° F. to make them more flexible and less subject to puncture by sharp parts of the lobster. The lobster is sleeved into the bag by the use of a light gauge steel sleever which is curved and sixteen inches long with a four inch extension at the end for protrusion into the end of the bag. The lobster slides into the bag tail first.

Each bag containing a lobster is then placed with the lobster upside down on its back for fifteen minutes before the next step. This allowance of time is for the remaining heat from the lobster itself to transfer to the warm bag. This results in the bag becoming more pliable for the next step.

One bag which has been found to be acceptable is made of 6 mil polyester film but it is expensive relative to a bag made of 6 mil polyethylene nylon film laminate. Pliability, resistance to puncture, ability to hold a vacuum and safeness in contact with food are the more important qualities of the film packaging. Since the package is preferably heat sealed, the capability of being heat sealed is also important. Other films than the two just mentioned will fit the above criteria, as will be known by those in the customer service departments of plastic packaging film suppliers.

In the next step the air is drawn out of each bag through the use of a vacuum sealing machine so effectively that the bag collapses around the lobster so that it is form fitting with very little air content. Also, this is where the pliability of the bag is important, because the sharp points located over the lobster would puncture the bag if the bag were brittle allowing air to reenter the bag. As soon as the vacuum is drawn on the bag, the bag is heat sealed across the width at the end. Then, as each bag is sealed, it is laid upside down on an open mesh wire tray until each tray contains twenty-four lobsters.

One vacuum sealer machine which can be used for the vacuum drawing and heat sealing is manufactured by International Kenfield Distributing Co., Broadway, Ill. 60153.

When each tray is filled it goes into a cooling room for four hours where temperature is maintained at 35° F. Then at the end of four hours, the tray is transferred to a freezer for twelve hours where the temperature is maintained at −20° F. Upon completion of the freezing process the lobsters are ready for packing which merely consists of weighing the film-packaged frozen cooked lobsters, putting them into retail boxes, marking the net weight on each retail box and then packing twelve retail boxes to a shipping case. The shipping case is sealed and put into a freezer until shipment by refrigerated trucks.

I have also found through experimentation that rapid freezing of the packaged cooked lobster, e.g. by liquid nitrogen blast-freezing drys out the meat because the tiny ice crystals which form can evaporate or sublime so easily during storage. Accordingly, freezing in a conventional e.g. circulated brine, indirect, refrigeration system is preferred with complete freezing taking at least 2–4 hours.

HOW THE FROZEN COOKED LOBSTER IS PREPARED BY THE CONSUMER

The bagged lobster is removed from the retail box and without opening the bag or defrosting the bagged lobster is submerged in a pot of water. The water is brought to a boil and allowed to boil for about seven minutes. Then the lobster is removed from the bag ready for eating.

If the lobster is to be broiled, it may be placed on its back and the entire length of its body and tail cut with a knife. The black intestinal vein and stomach (the hard sac near the head) are removed. The coral roe and "tomale" or liver of the lobster, which turns green when it is cooked should not be discarded, as many people consider these to be the best eating parts of the lobster. The claws should be cracked and the lobster placed as flat as possible, brushed with butter, seasoned and broiled until lightly browned. Many people like a sauce of melted butter and lemon juice on their broiled lobster.

Processed and prepared as suggested above, the frozen whole cooked cold North Atlantic lobsters of the invention are as tasty as those freshly caught and cooked. In particular, the blood, roe and intestinal contents which would be unconsolidated and runny if the lobster were blanched and/or positioned right-side-up during processing, are consolidated, easy to deal with and have not run from where they belong. Furthermore, the bacterial count of the lobster as purchased by the retail consumer is very acceptably low.

It should now be apparent that the frozen cooked whole cold North Atlantic lobster as described hereinabove possesses each of the attributes set forth in the specification under the heading "Summary of the Invention" hereinbefore because the frozen cooked whole cold North Atlantic lobster of the invention can be modified to some extent without departing from the principles of the invention as they have been outlined and explained in this specification, the present invention should be understood as encompassing all such modifications as are within the spirit and scope of the following claims.

What is claimed is:

1. A process for preserving cold North Atlantic lobsters comprising:
   boiling a live cold North Atlantic lobster, which weighs upwards from the weight of the smallest lobster which may be legally harvested, for about nine minutes in an aqueous solution of sodium chloride until the lobster is cooked;
   rinsing the lobster in cool water;
   inserting the lobster in a flexible plastic film bag which is then warmed by heat escaping from the lobster before proceeding, the lobster being reposed, back-down, feet-up, during this interim;
   sealing the bag closed;
   cooling the lobster to about 35° F. while the lobster remains back-down, feet-up; and
   freezing the lobster over a period of at least two to twelve hours; the lobster remaining back-down, feet-up while being frozen, at least until the blood and internal substances of the lobster have become positioned through freezing.

2. The process of claim 1 wherein the concentration and proportion of the boiling solution is about fifteen pounds of sodium chloride per forty gallons of water per fifty pounds of live cold North Atlantic lobster.

3. The process of claim 2 wherein the boiling step is successively conducted on batches of live cold North Atlantic lobsters totaling about five hundred pounds of lobsters before the boiling solution is discarded and replaced.

4. The process of claim 1 wherein the lobsters are cooled in the rinsing step to about 150° F.

5. The process of claim 4 wherein the plastic film bag is pre-heated to about 90° F.

6. A packaged frozen, cooked, whole, cold North Atlantic lobster characterized by:
   (a) including a frozen, cooked, whole, cold North Atlantic lobster of at least legal minimum size for harvest;
   (b) having a disposition of blood and internal substances consistent with the lobster having been disposed back-down, feet-up during post-cooking processing through freezing, and inconsistent with the lobster having been otherwise disposed during such time;
   (c) having ice crystals among the meat thereof whose size is consistent with the lobster having been slowly frozen over a period of at least two hours and inconsistent with the lobster having been substantially more rapidly frozen;
   (d) being enclosed within a sealed package.

7. The packaged, frozen, cooked, whole, cold North Atlantic lobster of claim 6 wherein the package is a flexible plastic film bag sealed under vacuum.

References Cited

UNITED STATES PATENTS 2,501,655   3/1950   Altenburg _____ 99—111

FOREIGN PATENTS 770,462   12/1966   Canada.

OTHER REFERENCES

The Frozen Food Cookbook, Simpson, p. 146, Avi Publishing Co., Mectport Conn. (1962).

NORMAN YUDKOFF, Primary Examiner

H. H. BERNSTEIN, Assistant Examiner

U.S. Cl. X.R.

62—64; 99—111, 171 R